(12) United States Patent
Sakajiri et al.

(10) Patent No.: US 6,282,612 B1
(45) Date of Patent: Aug. 28, 2001

(54) REMOVABLE MEMORY DEVICE FOR PORTABLE TERMINAL DEVICE

(75) Inventors: Noriyasu Sakajiri; Keiichi Hayashi, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/033,613

(22) Filed: Mar. 3, 1998

(30) Foreign Application Priority Data

Mar. 4, 1997 (JP) .................................................. 9-048627

(51) Int. Cl.$^7$ .............................. G06F 12/14; G06F 3/06; G06F 9/06
(52) U.S. Cl. ...................... 711/115; 711/163; 711/164; 383/3; 235/380; 235/492; 365/228; 365/195; 713/200; 713/202
(58) Field of Search .................................. 711/163, 164, 711/115; 383/3; 360/60; 713/200, 202; 902/26, 28; 235/441, 380, 492; 365/52, 195

(56) References Cited

U.S. PATENT DOCUMENTS

| 4,430,728 | * | 2/1984 | Beitel et al. ............... 379/93.02 |
| 5,293,610 | * | 3/1994 | Schwarz ........................ 711/164 |
| 5,552,776 | * | 9/1996 | Wade et al. .................. 340/825.31 |
| 5,675,628 | * | 10/1997 | Hokkanen ........................ 379/58 |
| 5,748,720 | * | 5/1998 | Loder ............................ 379/144 |
| 5,969,333 | * | 10/1999 | Barthelemy et al. ............. 235/492 |

FOREIGN PATENT DOCUMENTS

| 62-70096 | 3/1987 | (JP) . |
| 63-191450 | 8/1988 | (JP) . |
| 3-31949 | 2/1991 | (JP) . |
| 4-302245 | 10/1992 | (JP) . |
| 6-216842 | 8/1994 | (JP) . |

* cited by examiner

Primary Examiner—Do Hyun Yoo
Assistant Examiner—Melidi Namazi
(74) Attorney, Agent, or Firm—Foley & Lardner

(57) ABSTRACT

A removable memory device includes a memory for storing individual information therein, and a memory manager for protecting the memory when the removable memory device is not connected to a portable terminal device and for allowing access thereto when the removable memory device is connected to the portable terminal. A controller physically part of the removable memory device, is used for detecting an interconnection with the portable terminal device and for controlling the memory manager. The removable memory device protects the individual information stored within it from being illegally used.

14 Claims, 4 Drawing Sheets

REMOVABLE MEMORY DEVICE FOR PORTABLE TERMINAL DEVICE

BACKGROUND OF THE INVENTION

1. Field of the Invention

The present invention relates to removable memory devices. In particular, the present invention relates to a removable memory device for a portable terminal device that can be removably connected to such a portable terminal device as, e.g., a portable telephone and can store therein ID information, a telephone number list, and so on, etc., inherent in each portable terminal device.

2. Description of the Related Art

Such a portable terminal device as a portable telephone comprises a memory device which stores therein, for example, such a telephone number list as abbreviated dialing numbers or such individual information as ID information inherent in each portable terminal device, entered by a user. When a user wants to exchange the portable terminal device with another due to user's upgrading to a newer device, it is desirable to enable copying of the individual information already stored in the portable terminal device used so far to a new portable terminal device and also to enable use of the new portable terminal device with the same individual information.

Disclosed in Japanese Patent Application Laid-Open Publication No. Hei-4-302245 is a system wherein an information memory device for storing information necessary for operation of a radio telephone set, i.e., operation lock/unlock information, radio telephone participation information, or attached function restriction information, private information (i.e., individual information) such as a telephone number list, as explained in Japanese Patent Application Laid-Open Publication No. Hei-4-302245, is made in the form of an ID card or a chip and the information memory device is arranged to be removably connected to the radio telephone device.

In that system, when it is desired to exchange the radio telephone device with a newer device, by just removing the information memory device from the old radio telephone device and then attaching it to the new radio telephone device, the user can use the new radio telephone device under the same environment (that is, the same individual information) as that of the old radio telephone device.

However, the prior art radio telephone device has a problem that, since anyone can simply remove the information memory device therefrom, when another user removes the information memory device from other's radio telephone device and attaches the information memory device to his or her own radio telephone device, he or she can use it with use of the other's individual information.

SUMMARY OF THE INVENTION

In view of the above, the present invention has been made, and an object of the present invention is to provide a removable memory device for a portable terminal device which, when a user wants to exchange an old portable terminal device with new one and to use the new portable terminal device with individual information used so far, can reliably shift the individual information, can shorten a time necessary for the information shift to a large extent and can prevent easy illegal use of the individual information of the portable terminal device by others.

With the removable memory device for the portable terminal device in accordance with the present invention, when a user wants to exchange an old terminal device with new one, the user is required to protect an individual information already stored in the memory device.

In more detail, the memory device has a controller for judging an input command from a personal computer connected to the portable terminal device when the memory device is disconnected from the portable terminal device and a memory manager for protecting the memory at the time of the removal.

When the removable memory device of the present invention is illegally removed from the portable terminal device, the individual information stored in the memory is erased.

More specifically, the memory device has a controller for detecting a connection with the portable terminal and a memory manager having a function of erasing the memory.

The removable memory device in accordance with the present invention can be removed from the portable terminal device when a remove command (e.g., password) is entered.

For this reason, when wanting to exchange the terminal device, the user can exchange the individual information in a short time and also can prevent the user or a third party from illegally removing the memory device from the terminal device.

BRIEF DESCRIPTION OF THE DRAWINGS

The above-mentioned objects and advantages of the invention will become more apparent from the following detailed description when read in conjunction with the accompanying drawings, with like reference numerals indicating corresponding parts throughout, and wherein.

DETAILED DESCRIPTION OF THE PREFERRED EMBODIMENTS

The present invention will be explained in connection with the drawings. Embodiments of the present invention will then be explained in detail with reference to the drawings. First, a related system will be discussed.

Explanation will now be made as to how to copy the individual information to another portable terminal device in a related portable terminal device.

Initially, a first portable terminal device, as a copy originator, is connected to such an intermediate controller as a personal computer to transfer the individual information already stored in the memory device of the first portable terminal device to the intermediate controller. Next, after the first portable terminal device is removed from the intermediate controller, a second Portable terminal device, as a copy destinator, is connected to the intermediate controller to transfer to the second portable terminal device the individual information transferred from the first portable terminal device to the intermediate controller. The second portable terminal device stores in its own memory device the individual information transferred from the intermediate controller, at which stage the copying operation of the individual information is completed.

However, the related method has had a problem that the individual information is first transferred from the first portable terminal device to the intermediate controller and then stored in the memory device of the second portable terminal device, so that there is a danger that erroneous transfer of the individual information or data destruction during transmission may take place and an increased amount of information involves a longer transfer time.

Figure 1:
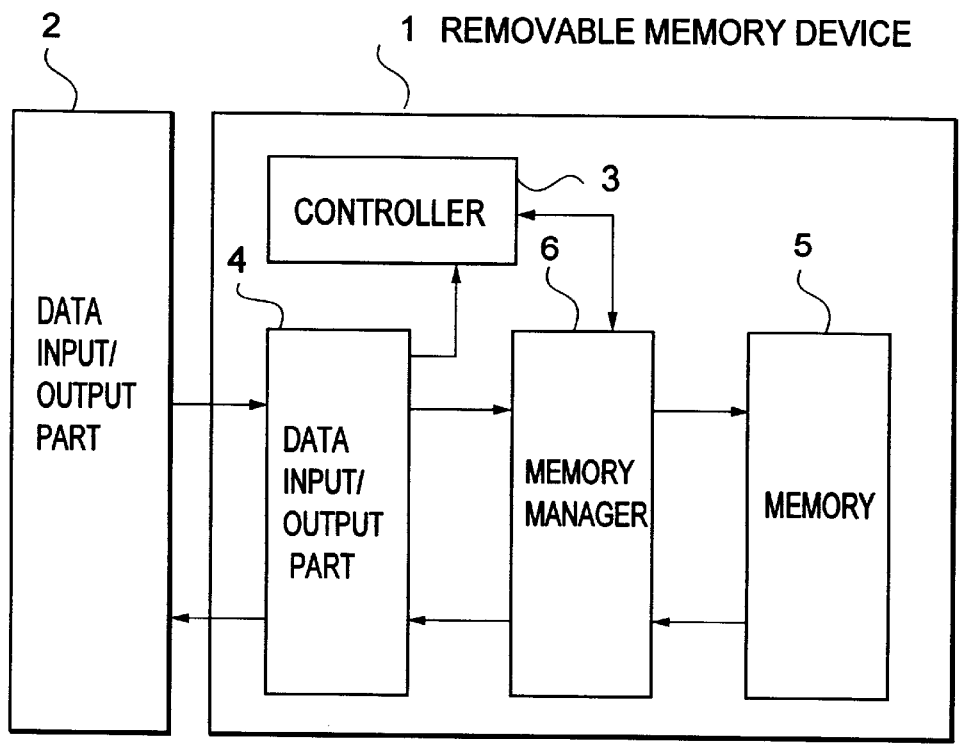
FIG. 1 is a block diagram of a removable memory device in accordance with a first embodiment of the present invention.

FIG. 1 is a block diagram of a removable memory device in accordance with a first embodiment of the present invention.

A removable memory device 1 is made up of a memory 5 for storing individual information therein, a memory manager 6 for protecting the memory when the removable memory device 1 is not connected to a portable terminal device and for allowing access thereto when the removable memory device is connected, a data input/output part 4 as a data sending/receiving port to/from a data input/output part 2 of the portable terminal device, and a controller 3 for detecting an interconnection with the portable terminal device through the data input/output part 4 and for controlling the memory manager 6.

Figure 2:
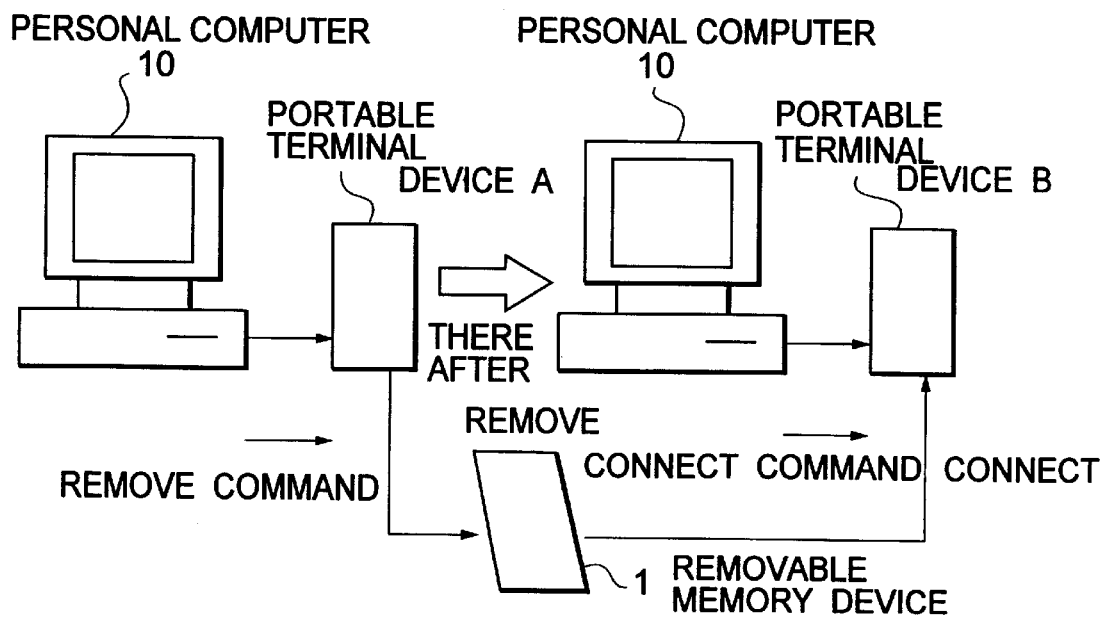
FIG. 2 is a configuration for explaining the shifting operation of individual information of a portable terminal device using the removable memory device in accordance with the present invention.
Figure 3:
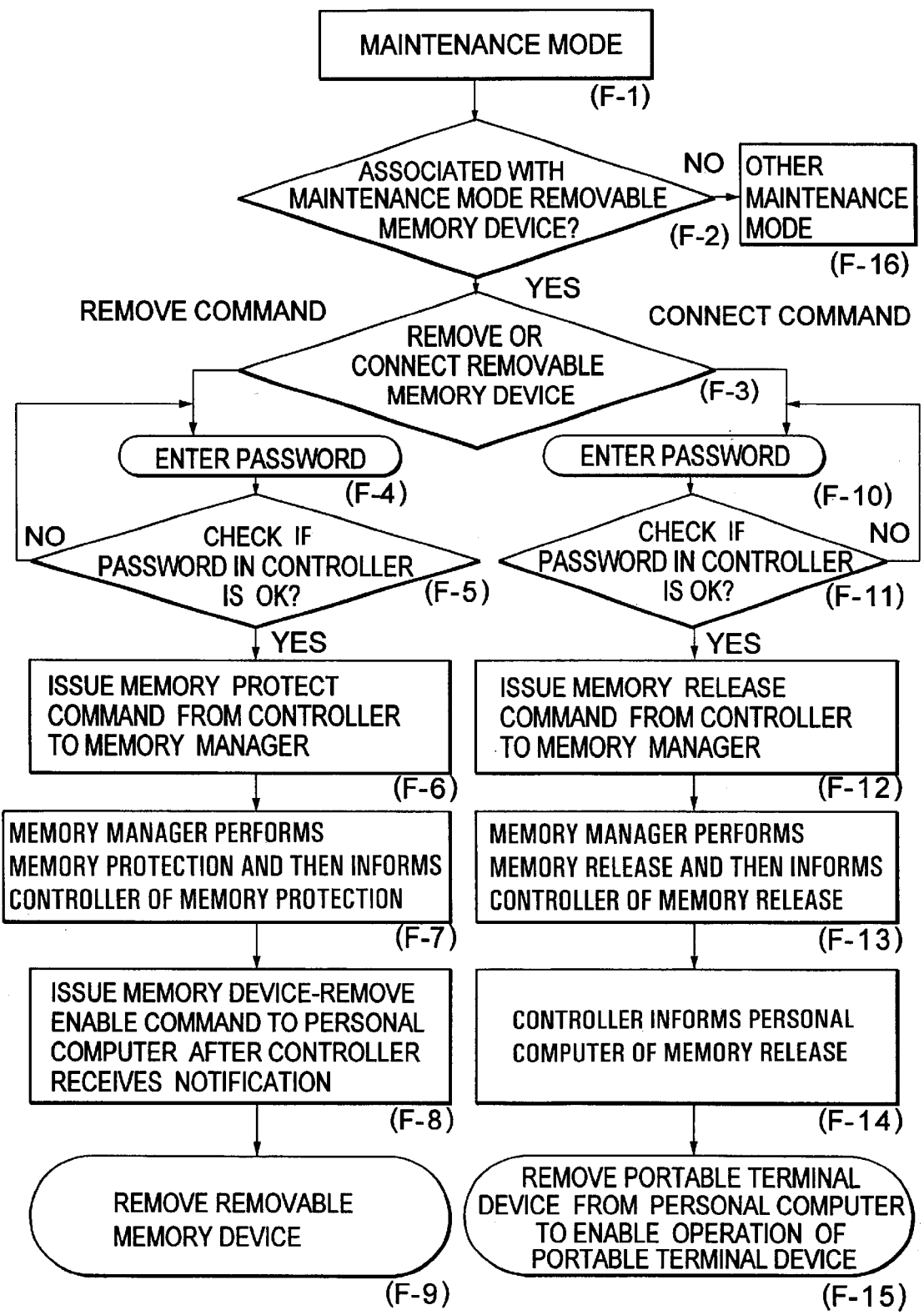
FIG. 3 is a flowchart for explaining the shifting operation of the individual information of the portable terminal device using the removable memory device in accordance with the present invention.

Explanation will next be made as to the shifting operation of the individual information of the portable terminal device using the removable memory device in accordance with the present invention, by referring to FIGS. 2 and 3. FIG. 2 is a configuration for explaining the shifting operation of the individual information of the portable terminal device using the removable memory device in accordance with the present invention, and FIG. 3 is a flowchart for explaining the operation thereof. Explanation will be made herein as to the shifting operation of the individual information stored in portable terminal device A in FIG. 2 to a portable terminal device B, by referring to steps (F-1) to (F-16) in FIG. 3.

First of all, by connecting the portable terminal device A to a personal computer 10, the portable terminal device A is put in its maintenance mode (step (F-1)). The maintenance mode may either be automatically entered when the portable terminal device A is connected to the personal computer 10, or the maintenance mode may be entered after a command to enter the maintenance mode is input via the personal computer 10.

In most systems, a command is required to enter the maintenance mode, but some systems allow for an automatically-entered maintenance when the portable terminal device A is connected to the personal computer 10.

The personal computer 10 acts as an information input/output apparatus for inputting commands, etc., to the portable terminal device or for displaying thereon information received from the portable terminal device. In the maintenance mode of the portable terminal device, the portable terminal device can do transactions on various types of maintenances. In the maintenance mode, when it is not associated with the removable memory device, the portable terminal device shifts to various types of maintenance modes (steps (F-2), (F-16)).

In this maintenance mode, next, a maintenance operator selects a removable mode for the removable memory device 1. More specifically, the operator enters a remove command into the portable terminal device A connected to the personal computer 10 (steps (F-2) and (F-3)). This remove command is accepted by the controller 3 of the removable memory device 1 via the data input/output part 2 of the portable terminal device A and the data input/output part 4 of the removable memory device 1 (refer to FIG. 1).

The controller 3, after accepting the remove command, requires a password from the maintenance operator. The maintenance operator, in response to the password request, enters the password (password for the removal) from the personal computer 10 (step (F-4)). When the controller 3 finds a password coincidence between the operator-entered password and a password stored in the removable memory device 1 (step (F-5)), the controller 3 issues to the memory manager 6 a command to protect the memory 5 (step (F-6)). In the step (F-5), when the maintenance operator removes the removable memory device 1 from the portable terminal device A without finding a password coincidence in the controller 3, the contents stored in the memory 5 is erased and the memory 5 is initialized. The removable memory device 1 may be removed from the portable terminal device A without erasing the contents stored in the memory 5. In this case, as described later, when the portable terminal device B mounted the removable memory device 1 is connected to the personal computer 10, the contents stored in the memory 5. The password stored in the removable memory device 1 is typically only changeable by a user with system privileges or the like, and cannot be changed by a normal user. This password may be stored in the removable memory device (either in the controller 3 or the memory 5) during manufacture of the removable memory device 1, for example.

The memory manager 6, when receiving the instruction, protects the memory 5 and then issues a notification of completion of the memory protection to the controller 3 (step (F-7)). The controller 3, when receiving the notification, informs the personal computer 10 that the portable terminal device A is removable from the personal computer 10 via the portable terminal device A (step (F-8)). The personal computer 10, when receiving the removable notification, informs the maintenance operator to remove the portable terminal device A from the personal computer 10 and to remove the removable memory device 1 from the portable terminal device A.

The maintenance operator, after receiving the removal notice by means of the personal computer 10, removes the removable memory device 1 from the portable terminal device A (step (F-9)), mounts the removable memory device 1 into the portable terminal device B having the protected contents stored in the memory 5, connects the portable terminal device B to the personal computer 10, selects a connection mode of the removable memory device 1 from the maintenance mode (F-1), and then enters on the personal computer 10 a connect command to the portable terminal device B (steps (F-2) and (F-3)).

Even when the controller 3 receives this connect command, as in the remove command explained previously, the controller 3 demands the password of the maintenance operator (step (F-10)). When the controller 3 finds a coincidence of the password entered by the maintenance operator (step (F-11)), the controller issues a memory release instruction to the memory manager 6 (step (F-12)). In the step (F-11), when the maintenance operator removes the removable memory device 1 from the portable terminal device A without finding a password coincidence in the controller 3, the contents stored in the memory 5 is erased and the memory 5 is initialized.

This instruction causes the memory manager 6 to release the memory 5 and to inform the controller 3 of completion of the memory release (step (F-13)). The controller 3, after receiving the notification, informs the personal computer 10 of completion of the connection of the removable memory device 1 via the portable terminal device B (step (F-14)). Thereafter, the maintenance operator is permitted to separate the portable terminal device B from the personal computer 10. After the portable terminal device B is separated from the personal computer 10, the operator can use the portable terminal device B (step (F-15)).

Figure 4:
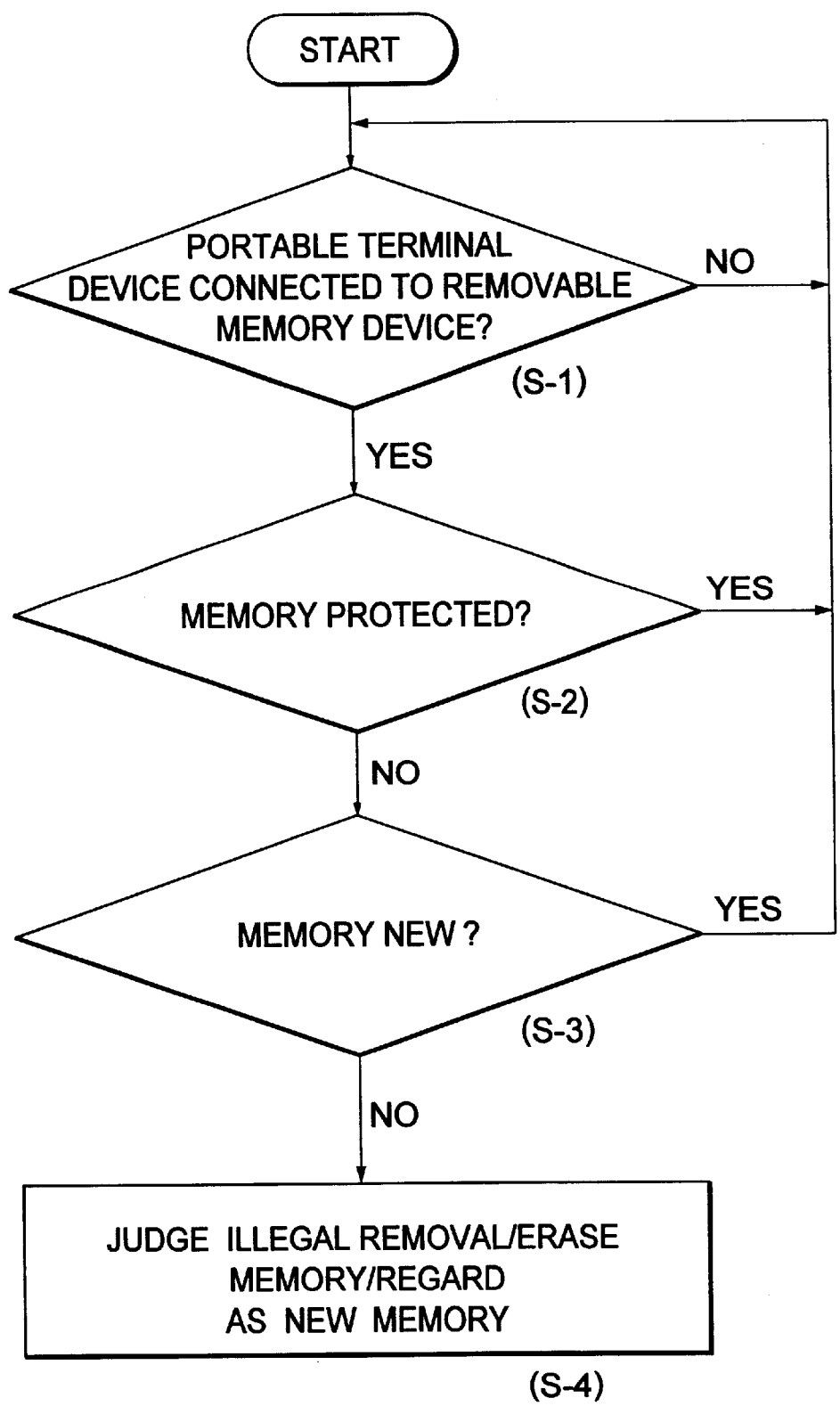
FIG. 4 is a flowchart for explaining the operation of the removable memory device according to the first embodiment of the present invention when the removable memory device was illegally removed from the portable terminal device.

Explanation will then be made as to the operation of the removable memory device 1 according to the first embodiment when the operator removes the removable memory device 1 from the portable terminal device without following the above procedure, by referring to a flowchart of FIG. 4.

The controller 3, when confirming a connection of the portable terminal device through the data input/output part 4 (step (S-1)) and the memory protection is not carried out (step (S-2)) and the memory 5 is not newly mounted (step (S-3)) (that is, when incorrect removal is carried out), issues a memory erase instruction to the memory manager 6. The memory manager 6, when receiving the memory erase instruction, completes erasing of the contents stored in the memory 5 and then informs the controller 3 of completion of the memory erase. The controller 3, after receiving the notification, newly utilizes the memory 5 (step (S-4)).

In the step (S-2), when the memory protection is carried out, the contents stored in the memory 5 is not erased even if the maintenance operator removes the removable memory device 1 from the portable terminal device A. In the step (S-3), when the memory 5 is newly mounted, the memory 5 is initialized.

When the operator connects the removable memory device 1 to the portable terminal device without following the aforementioned procedure, the present invention can be arranged so that the portable terminal device prohibits its operation using the individual information stored in the removable memory device 1 connected thereto.

As has been explained in the foregoing, the removable memory device in accordance with the present invention is arranged so that an operator is required to enter the remove command (password) after connected from the personal computer and at the time of connection, operator's input of the connect command (password) from the personal computer causes the memory to be released. This enables the memory having the individual information already stored therein to be protected, so that illegal access can be prevented and shift of the individual information can be easily realized even at the time of exchange between portable terminal devices.

Figure 5:
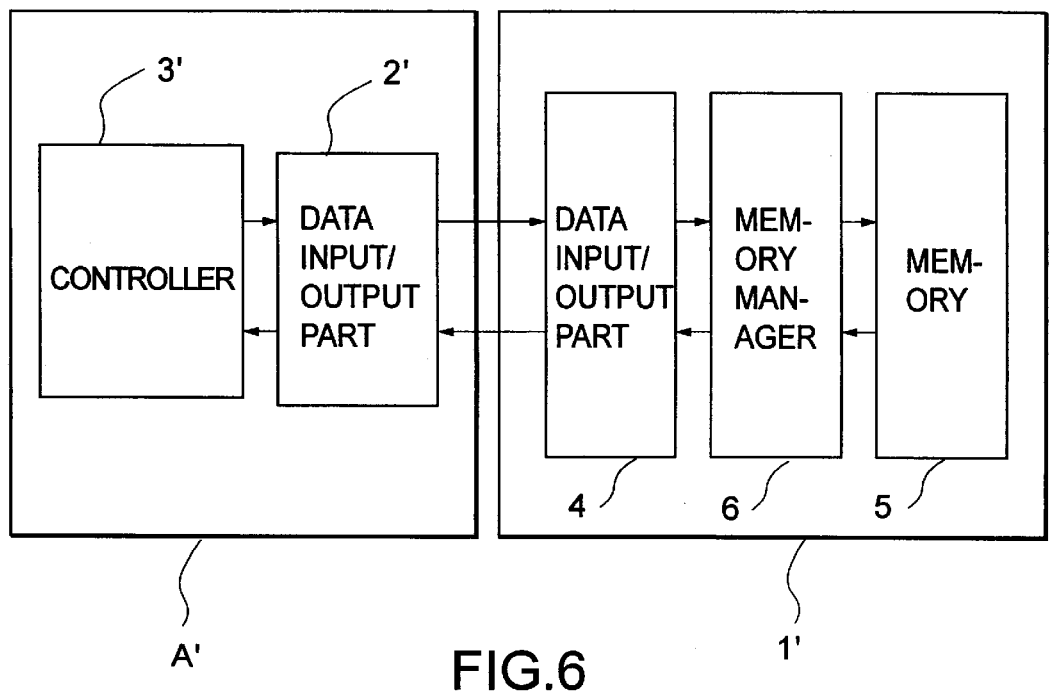
FIG. 5 is a block diagram of a removable memory device and a part of a portable terminal device in accordance with a second embodiment of the present invention.
Figure 6:
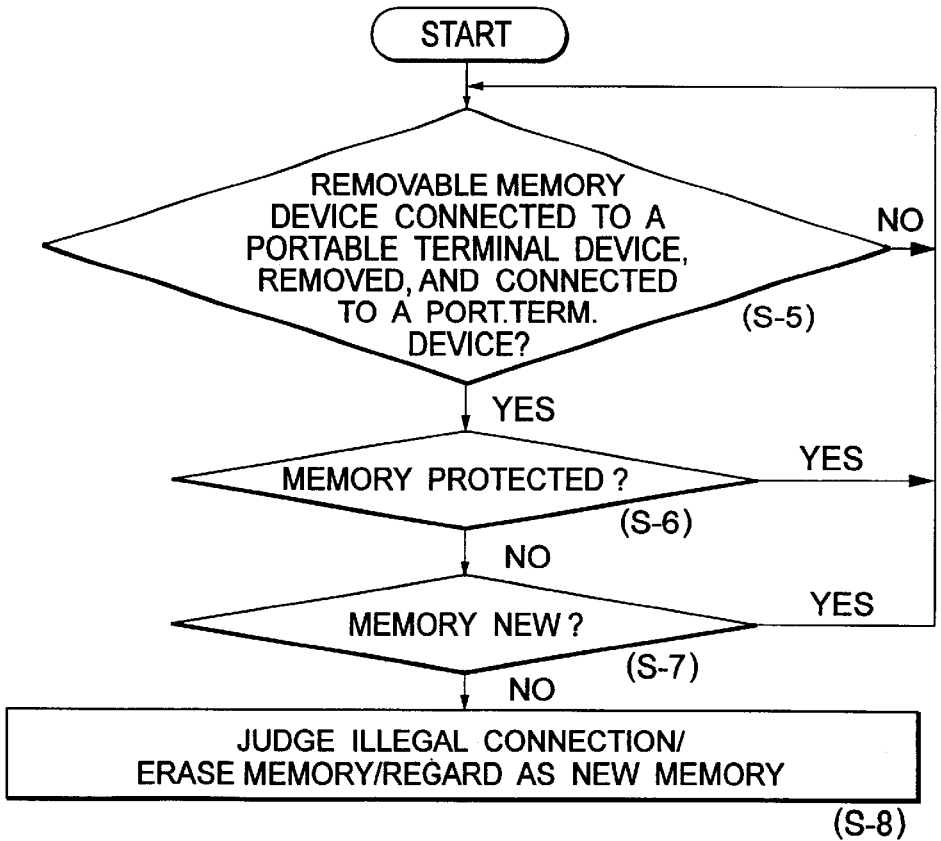
FIG. 6 is a flowchart for explaining the operation of the removable memory device according to the second embodiment of the present invention when the removable memory device was illegally removed from the portable terminal device.

A second embodiment of the invention is shown in FIG. 5. In that figure, the controller 3' is provided in the portable terminal device A', which is external to the remote memory device 1'. FIG. 6 is a flowchart for explaining the operation according to the second embodiment. In FIG. 6, when the removable memory device 1' is disconnected from a portable terminal device A' and then later reconnected to the same portable terminal device A' or to another portable terminal device (step S-5), and the memory 5 is not protected (step S-6), and the memory 5 is not newly mounted (step S-7), the controller 3' issues a command to the memory manager 6 to erase the contents stored in the memory 5 if the memory 5 is not protected. After a non-protected memory 5 has been erased, the memory manager 6 informs the controller 3' of completion of the memory erase (via the data input output part 4 of the removable memory device 1' and the data input/output part 2 of the portable terminal device A'). The controller 3', after receiving the notification, newly utilizes the memory 5 (step S-8). Thus, in the second embodiment, the memory 5 is not immediately erased under command of a controller 3 external to the removable memory device 1' after disconnection of a removable memory device 1' from a portable terminal device A', in which the removable memory device has a non-new, non-protected memory (as in the first embodiment), but instead the erasure is performed by a controller 3' external to the removable memory device 1' at a time when the removable memory device 1' is reconnected to a portable terminal device A' (having a controller 3' housed therein). In an alternative embodiment, the controller is housed in the personal computer 10.

While embodiments have been described herein, modification of the described embodiments may become apparent to those of ordinary skill in the art, following the teachings of the invention, without departing from the scope of the invention as set forth in the appended claims. For example, other ways of disabling the removable memory device may be contemplated while remaining within the teachings of the invention, such as, for example, disabling the data input/output part 4 or the memory manager 6, and not erasing the memory 5. For the data input/output part, this would require a control signal (not shown in FIG. 1) from the controller 3 to the data input/output part 4, where that control signal would disable the data input/output part 4.

Further, in the embodiments of the invention, a maintenance operator enters commands, a password, and so on, from a personal computer 10. However, the maintenance operator may be able to enter them from a portable terminal device A.

Moreover, in the embodiments of this invention, the maintenance operator enters commands, a password, and so on, but a user of a portable terminal device A may be able to enter them.

What is claimed is:

1. A removable memory device comprising:
   an input port which is connectable to a portable terminal device, for
   receiving a first command and a first password through the portable terminal device when the removable memory device is connected to the portable terminal device;
   a storage for storing information for operating the portable terminal device and a second password; and
   a control unit responsive to the first command and the first password input from said input port, for protecting information stored in said storage according to the first command to prevent unauthorized access when the first password is not coincident with the second password stored in said storage, said input port, storage and control unit physically part of said removable memory device so as to be removable from said portable terminal device with said removable memory device, wherein said control unit erases the information stored in said storage, when the removable memory device is removed from the portable terminal device without coincidence of the first password and the second password.

2. A removable memory device as set forth in claim 1, wherein said input port receives a second command and a third password through the portable terminal device when the removable memory device is connected to the portable terminal device, and said control unit releases the information stored in said storage according to the second command when the third password is coincident with a fourth password stored in said storage, and informs an operator that the information is released.

3. A removable memory device as set forth in claim 2, wherein said controller prohibits operation of the portable terminal device using the information stored in said storage when the removable memory device is connected to the portable terminal device without coincidence of the third password and the fourth password.

4. A memory device as set forth in claim 1, wherein the removable memory device is initialized when the information stored in the storage on the removable memory device is erased.

5. A removable memory device as recited in claim 1, wherein said control unit is operative to inform an operator of the portable terminal device that the memory device information is protected when said coincidence occurs between said first and second passwords.

6. A removable memory device as recited in claim 1, wherein said control unit is operative to inform an operator of the portable terminal device that the memory device information is protected and that said memory device is removable from said portable terminal device when said coincidence occurs between said first and second passwords.

7. A removable memory device as recited in claim 2, wherein said control unit informs an operator of said portable terminal device that the information has been released.

8. A system comprising:
a first terminal device having a first data input/output port and operated based on individual information, wherein a first command and a first password are output from the first data input/output port; and
a removable memory device connected to said first terminal device, for storing the individual information, wherein said removable memory device comprises:
an input port connected to the first data input/output port, for receiving the first command and the first password through the first data input/output port, and
a control unit responsive to the first command and the first password from said input port, for protecting the individual information stored in the removable device according to the first command to prevent unauthorized access when the first password is not coincident with a second password stored in said removable memory device,
said input port and control unit physically part of said removable memory device so as to be removable from said first terminal device with said removable memory device.

9. A system as set forth in claim 8, further comprising a second terminal device having a second data input/output port and operating based on the individual information stored in said removable memory device which has been removed from said first terminal device and has been connected to said second terminal device.

10. A system as set forth in claim 9, wherein the second data input/output port of said second terminal device supplies a second command and a third password to said memory device when said removable memory device is connected to said second terminal device after removal of said removable memory device from said first terminal device, and the control unit of said removable memory device releases the individual information stored in the removable memory device according to the second command when the third password is coincident with a fourth password stored in said memory device.

11. A system as set forth in claim 8, wherein the removable memory device is initialized when the individual information stored in the removable memory device is erased.

12. A system as recited in claim 8, wherein said control unit is operative to inform an operator of the first terminal device that the removable memory device with individual information is protected when said coincidence occurs between said first and second passwords.

13. A system as recited in claim 8, wherein said control unit is operative to inform an operator of the first terminal device that the removable memory device with individual information is protected and that said removable memory device is removable from said first terminal device when said coincidence occurs between said first and second passwords.

14. A system as recite in claim 10, wherein said control unit informs an operator of said second terminal device that the individual information stored in said removable memory device has been released.

* * * * *